United States Patent
Edlund et al.

(10) Patent No.: US 7,008,708 B2
(45) Date of Patent: Mar. 7, 2006

(54) SYSTEM AND METHOD FOR EARLY DETECTION OF CONTAMINANTS IN A FUEL PROCESSING SYSTEM

(75) Inventors: David J. Edlund, Bend, OR (US); William A. Pledger, Bend, OR (US)

(73) Assignee: IdaTech, LLC, Bend, OR (US)

(*) Notice: Subject to any disclaimer, the term of this patent is extended or adjusted under 35 U.S.C. 154(b) by 0 days.

(21) Appl. No.: 10/986,417

(22) Filed: Nov. 10, 2004

(65) Prior Publication Data
US 2005/0064253 A1    Mar. 24, 2005

Related U.S. Application Data

(60) Division of application No. 10/244,904, filed on Sep. 16, 2004, now Pat. No. 6,818,335, which is a continuation of application No. 09/477,128, filed on Jan. 3, 2000, now Pat. No. 6,451,464.

(51) Int. Cl.
*H01M 8/04* (2006.01)
*H01M 8/06* (2006.01)
(52) U.S. Cl. .............................. 429/22; 429/17; 429/23
(58) Field of Classification Search ................... 429/13, 429/17, 19, 22, 23
See application file for complete search history.

(56) References Cited

U.S. PATENT DOCUMENTS

| | | |
|---|---|---|
| 3,469,944 A | 9/1969 | Bocard et al. |
| 3,524,819 A | 8/1970 | Guerrieri |
| 3,765,946 A | 10/1973 | Werner et al. |
| 3,857,735 A | 12/1974 | Louis et al. |
| 3,884,838 A | 5/1975 | Fleming et al. |
| 3,955,941 A | 5/1976 | Houseman et al. |
| 4,098,959 A | 7/1978 | Fanciullo |
| 4,098,960 A | 7/1978 | Gagnon |
| 4,349,613 A | 9/1982 | Winsel |
| 4,533,607 A | 8/1985 | Sederquist |
| 4,642,273 A | 2/1987 | Sasaki |
| 4,781,241 A | 11/1988 | Misage et al. |
| 4,788,004 A | 11/1988 | Pinto et al. |
| 4,820,594 A | 4/1989 | Sugita et al. |
| 4,904,455 A | 2/1990 | Karafian et al. |
| 4,904,548 A | 2/1990 | Tajima |
| 5,006,846 A | 4/1991 | Granville et al. |
| 5,030,661 A | 7/1991 | Lywood |

(Continued)

FOREIGN PATENT DOCUMENTS

EP    0434562 A1    6/1991

(Continued)

OTHER PUBLICATIONS

English language abstract of Japanese Patent No. 02188405, 1990.

(Continued)

*Primary Examiner*—Tracy Dove
(74) *Attorney, Agent, or Firm*—Kolisch Hartwell, P.C.

(57) ABSTRACT

A system and method for preventing damage to a fuel cell stack resulting from impurities in the product stream from a fuel processor, such as may occur should the separation region of the fuel processor fail. The system and method include detecting the concentration of at least one component of the product stream and isolating the fuel cell stack should this concentration exceed an acceptable threshold level. In some embodiments, the system or method are adapted to detect the concentration of a component that itself is not harmful to the fuel cell stack, or which is not harmful in an associated threshold concentration. In some embodiments, the detected composition is at least one of water, methane, and carbon dioxide.

43 Claims, 2 Drawing Sheets

U.S. PATENT DOCUMENTS

| | | | |
|---|---|---|---|
| 5,229,222 A | 7/1993 | Tsutsumi et al. | |
| 5,366,818 A | 11/1994 | Wilinson et al. | |
| 5,366,821 A | 11/1994 | Merritt et al. | |
| 5,401,589 A | 3/1995 | Palmer et al. | |
| 5,417,051 A | 5/1995 | Ankersmit et al. | |
| RE35,002 E | 7/1995 | Matsubara et al. | |
| 5,432,710 A | 7/1995 | Ishimaru et al. | |
| 5,458,857 A | 10/1995 | Collins et al. | |
| 5,509,942 A | 4/1996 | Dodge | |
| 5,527,632 A | 6/1996 | Gardner | |
| 5,534,659 A | 7/1996 | Springer et al. | |
| 5,612,012 A | 3/1997 | Soma et al. | |
| 5,616,430 A | 4/1997 | Aoyama | |
| 5,624,768 A | 4/1997 | Tanokura | |
| 5,631,820 A | 5/1997 | Donnelly et al. | |
| 5,637,414 A | 6/1997 | Inoue et al. | |
| 5,658,681 A | 8/1997 | Sato et al. | |
| 5,677,073 A | 10/1997 | Kawatsu | |
| 5,712,052 A | 1/1998 | Kawatsu | |
| 5,750,076 A | 5/1998 | Buswell et al. | |
| 5,763,113 A | 6/1998 | Meltser et al. | |
| 5,771,476 A | 6/1998 | Mufford et al. | |
| 5,780,179 A | 7/1998 | Okamoto | |
| 5,795,666 A | 8/1998 | Johnssen | |
| 5,798,186 A | 8/1998 | Fletcher et al. | |
| 5,821,185 A | 10/1998 | White et al. | |
| 5,861,137 A | 1/1999 | Edlund | |
| 5,897,766 A | 4/1999 | Kawatsu | |
| 5,897,970 A | 4/1999 | Isomura et al. | |
| 5,929,538 A | 7/1999 | O'Sullivan et al. | |
| 5,932,181 A | 8/1999 | Kim et al. | |
| 5,964,309 A | 10/1999 | Kimura et al. | |
| 5,985,474 A | 11/1999 | Chen et al. | |
| 5,989,739 A | 11/1999 | Zur Megede et al. | |
| 5,991,670 A | 11/1999 | Mufford et al. | |
| 5,997,594 A | 12/1999 | Edlund et al. | |
| 6,001,499 A | 12/1999 | Grot et al. | |
| 6,022,634 A | 2/2000 | Ramunni et al. | |
| 6,042,956 A | 3/2000 | Lenel | |
| 6,045,933 A | 4/2000 | Okamoto | |
| 6,054,229 A | 4/2000 | Hsu et al. | |
| 6,077,620 A | 6/2000 | Pettit | |
| 6,083,637 A | 7/2000 | Walz et al. | |
| 6,103,410 A | 8/2000 | Fuller et al. | |
| 6,103,411 A | 8/2000 | Matsubayashi et al. | |
| 6,120,923 A | 9/2000 | Van Dine et al. | |
| 6,162,267 A * | 12/2000 | Priegnitz et al. | 48/199 FM |
| 6,165,633 A | 12/2000 | Negishi | |
| 6,190,623 B1 | 2/2001 | Sanger et al. | |
| 6,221,117 B1 | 4/2001 | Edlund et al. | |
| 6,855,452 B1 * | 2/2005 | Cooper et al. | 429/41 |

FOREIGN PATENT DOCUMENTS

| | | |
|---|---|---|
| EP | 1065741 A2 | 1/2001 |
| EP | 0 946 406 B1 | 11/2001 |
| EP | 0828 303 B1 | 11/2001 |
| JP | 4-163860 | 6/1992 |
| WO | WO 97/43207 | 11/1997 |
| WO | WO 97/43796 | 11/1997 |
| WO | WO 99/65097 | 12/1999 |
| WO | WO 00/02282 | 1/2000 |
| WO | WO 00/04600 | 1/2000 |

OTHER PUBLICATIONS

English language abstract of Japanese Patent No. 6176779, 1994.

English language abstract of Japanese Patent No. 7057758, 1995.

English language abstract of Japanese Patent No. 07006780, 1995.

English language abstract of Japanese Patent No. 828793, 1996.

English language abstract of Great Britain Patent No. 2,305,186, 1997.

English language abstract of German language PCT Patent Application Serial No. WO 97/43796, 1997.

English-language abstract of Japanese Patent No. 2000061318, 2000.

English language abstract of German language PCT Patent Application Serial No. WO 00/04600, 2000.

Amphlett, J. C., et al., "On Board Hydrogen Purification for Steam Reformer/PEM Fuel Cell Vehicle Power Plants," Energy Progress X, Proceedings of the 10th World Hydrogen Energy Conference, Cocoa Beach, Florida, U.S.A., vol. 3, pp. 1681-1690 (Jun., 1994).

Emonts, B., et al., "Compact Methanol Reformer Test for Fuel-Cell Powered Light-Duty Vehicles," Fifth Grove Fuel Cell Symposium, Commonwealth Institute, London, U.K., p. 42 (Sep. 22-25, 1997).

Oertel, Michael, et al., "Steam Reforming of Natural Gas with Integrated Hydrogen Separation for Hydrogen Production," Chemical Engineering Technology, vol. 10, pp. 248-255 (1987).

Privette et al., "Status of SOFCo SOFC Technology Development," presented at the 1996 Fuel Cell Seminar held Nove. 17-20, 1996 in Orlando, Florida, pp. 206-209.

* cited by examiner

SYSTEM AND METHOD FOR EARLY DETECTION OF CONTAMINANTS IN A FUEL PROCESSING SYSTEM

RELATED APPLICATIONS

This application is a divisional patent application of and claims priority to U.S. patent application Ser. No. 10/244,904, which was filed on Sep. 16, 2004, issued on Nov. 16, 2004 as U.S. Pat. No. 6,818,335, and which is a continuation of U.S. patent application Ser. No. 09/477,128, which was filed on Jan. 3, 2000, and issued on Sep. 17, 2002 as U.S. Pat. No. 6,451,464. The complete disclosures of the above-identified patent applications are hereby incorporated by reference for all purposes.

FIELD OF THE INVENTION

The present invention relates generally to fuel processing systems, and more particularly to a system and method for early detection of impending failure of hydrogen-purifiers used in such fuel processing systems.

BACKGROUND AND SUMMARY OF THE INVENTION

Fuel processing systems include a fuel processor, or hydrogen-generating assembly, which produces hydrogen gas, and a fuel cell stack, which produces an electric current and water from the hydrogen gas and air. Because fuel cells are extremely sensitive to certain contaminants, care is taken to prevent the hydrogen feed to the fuel cell stack from containing more then acceptable levels of these contaminants. Therefore there is a need to detect contaminants in the product hydrogen stream from a fuel processor before the contaminated product stream reaches the fuel cell stack.

The present invention provides a system and method for detecting impurities in the hydrogen product stream of a fuel processing system in sufficient time to prevent the impurities from reaching the fuel cell stack associated with the fuel processor. In some embodiments, the system or method are adapted to detect the concentration of a component that itself is not harmful to the fuel cell stack, or which is not harmful in an associated threshold concentration. In some embodiments, the detected composition is at least one of water, methane, and carbon dioxide.

Many other features of the present invention will become manifest to those versed in the art upon making reference to the detailed description which follows and the accompanying sheets of drawings in which preferred embodiments incorporating the principles of this invention are disclosed as illustrative examples is only.

DETAILED DESCRIPTION AND BEST MODE OF THE INVENTION

Figure 1:
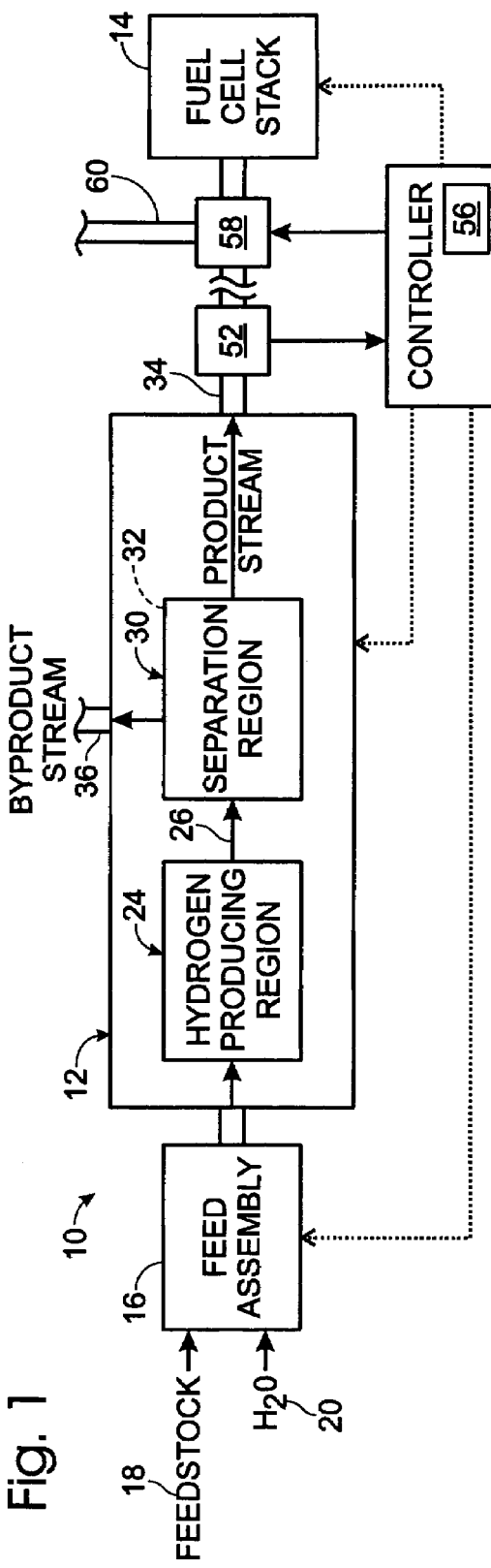
FIG. 1 is a schematic diagram of a fuel processing system according to the present invention.

A fuel processing system is shown in FIG. 1 and indicated generally at 10. System 10 includes a fuel processor 12 and a fuel cell stack 14. Fuel cell stack 14 includes at least one fuel cell, and typically includes multiple fuel cells coupled together. The fuel cell stack receives hydrogen gas from the fuel processor and produces an electric current therefrom as the hydrogen gas is reacted with oxygen to form water. The electric current produced by the fuel cell stack is then used to meet the electric load applied by one or more associated devices, such as vehicles, households, generators, boats, etc. Examples of suitable fuel cells include proton exchange membrane (PEM) fuel cells and alkaline fuel cells.

Fuel processor 12 is a device or assembly of devices adapted to produce hydrogen gas through any suitable mechanism from a single or multi- component feedstock comprising one or more feed streams. Examples of suitable fuel processors include steam reformers. Examples of suitable mechanisms include steam reforming, partial oxidation, autothermal reforming and pyrolysis of a hydrocarbon or an alcohol, and electrolysis of water. It should be understood that the feedstock for fuel processor 12 will vary depending upon the particular form of fuel processor being used. For example, when fuel processor 12 is a steam reformer, the feedstock will typically include water and an alcohol or hydrocarbon. Autothermal reforming will also include a water component or stream as a part of the feedstock, however, pyrolysis and partial oxidation will not.

For purposes of illustration, the following description will describe fuel processor 12 and its various embodiments generally, since it is within the scope of the present invention that fuel processor 12 may be implemented as any device or series of devices through which hydrogen gas is produced, as well as in the context of a steam reformer.

In FIG. 1, a feed assembly 16 is shown delivering the feedstock and water streams 18 and 20 to fuel processor 12. Feed assembly 16 includes one or more pumps that draw the streams from supplies (not shown). When the feedstock is miscible with water, such as methanol, the feed assembly may include a mixing chamber in which the feedstock and water are premixed prior to delivery to the fuel processor. Streams 18 and 20 may also be preheated, or even vaporized, prior to delivery to the fuel processor. When a water stream is not required for the particular mechanism through which fuel processor 12 produces hydrogen gas, then it should be understood that feed assembly 16 will not include water stream 20.

Fuel processor 12 includes a hydrogen-producing region 24, in which hydrogen gas is produced. This initial hydrogen stream 26 typically includes impurities that must be removed before the produced hydrogen gas can be delivered to fuel cell stack 16. In the context of a steam reformer, this region may be referred to as a reforming region, in which the feedstock and water are reacted catalytically to produce a hydrogen stream (or reformate stream) containing hydrogen and byproducts. Byproducts of the reforming reaction include carbon dioxide and carbon monoxide.

Figure 2:
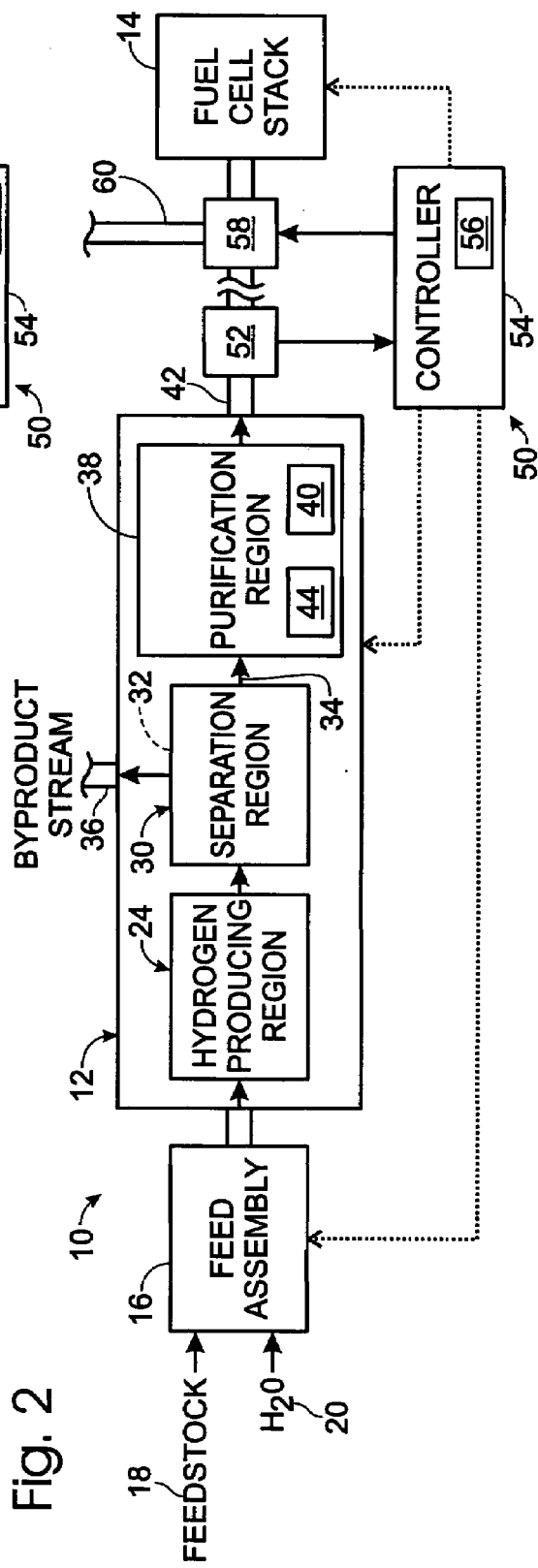
FIG. 2 is the diagram of FIG. 1 showing another embodiment of a fuel processing system according to the present invention.

Stream 26 passes to a separation region, or separation assembly, 30 in which hydrogen gas is at least partially purified to produce a product hydrogen stream 34 that contains at least a substantial portion of the hydrogen gas in stream 26. Separation region 30 removes at least a portion of the impurities from stream 26, resulting in product hydrogen stream 34 having a higher concentration of hydrogen gas than stream 26. Region 30 may retain or consume the removed portion of stream 26, or it may exhaust the removed portion as a byproduct stream 36, such as shown in FIGS. 1 and 2. One suitable form of separation region includes one or more hydrogen-selective membranes 32 that permit hydrogen gas to pass therethrough to produce product stream 34, with the remaining components of stream 26 that are unable to pass through the membrane(s) forming byproduct stream 36. Byproduct stream 36 typically will contain unreacted feedstock, some hydrogen gas, carbon dioxide, and carbon monoxide. Suitable hydrogen-selective membranes include membranes formed from palladium, palladium alloys or ceramics. Separation region 30 may include any other suitable device or utilize any other suitable mechanism for purifying hydrogen, such as an absorbent bed or a catalytic reactor. Examples of absorbent beds include zeolite and carbon beds. Examples of catalytic reactors include water-gas-shift reactors and selective oxidation reactors.

Sometimes the product stream contains compositions other than hydrogen gas. This may occur, for example, when there is a small leak or other defect in the membrane(s) in the separation region. Therefore, the product stream may also contain some concentrations of carbon dioxide and carbon monoxide. Therefore, it is preferable that fuel processor 12 includes a polishing region that reduces the concentration of compositions that are harmful to fuel cell stack 14 to below acceptable levels. In FIG. 2, fuel processing system 10 is shown including a fuel processor with such a polishing region 38. In polishing region 38, the concentration of components other than hydrogen in the product stream are reduced, with the specific goal of reducing the concentrations of components that are harmful to fuel cell stack 14 to below acceptable levels.

For example, region 38 may include one or more methanation catalyst beds 40 that convert carbon monoxide and carbon dioxide in the product stream into methane and water according to the following reactions:

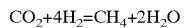
$CO_2 + 4H_2 = CH_4 + 2H_2O$

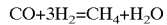
$CO + 3H_2 = CH_4 + H_2O$

Because methane and water will not damage fuel cell stack 14, the polished product stream 42 will not impair the operation of stack 14, so long as the concentrations of carbon monoxide and carbon dioxide are below acceptable minimum levels, as discussed in more detail below.

Sometimes product stream 34 also contains some concentration of unreacted feedstock and water that also pass through separation region 30. Because of this, polishing region 38 may further include a reforming region 44 to convert any unreacted feedstock into hydrogen gas, carbon dioxide and carbon monoxide. This increases the amount of hydrogen gas produced by the fuel processor, thereby improving the efficiency of the fuel processor. However, it can be understood that the reforming region of purification region 38 should be upstream from the methanation bed(s) so that any carbon monoxide and carbon dioxide produced in the second reforming region may be converted into compositions that will not damage the fuel cell stack.

An example of a suitable steam reforming fuel processor with a polishing region is disclosed in copending U.S. patent application Ser. No. 09/291,447, the disclosure of which is hereby incorporated by reference. It should be understood that a second reforming region is not essential to the present invention, and that the polishing region may utilize any other suitable method for removing or reducing the concentration of components that are harmful to fuel cell stack 14. It should also be understood that the present invention may be implemented with fuel processors that lack a polishing region.

Regardless of the specific construction of the fuel processor, the separation region may suffer a failure, namely, a significant loss in hydrogen selectivity. For example, in membrane-based purification regions, this may occur if there is a physical defect in a hydrogen-separation membrane or if a tear or other hole was introduced to the membrane during operation. Should such a failure occur, the concentrations of carbon dioxide and carbon monoxide in the product stream will increase dramatically. Fuel processors including a polishing region will be able to reduce these concentrations to some degree, however, the concentration of carbon monoxide and carbon dioxide is likely to exceed the capacity of polishing region 38.

Left unchecked, the product stream passing to the fuel cell stack would contain concentrations of carbon dioxide and carbon monoxide that exceed the acceptable minimum levels. Especially of concern is the concentration of carbon monoxide, because a concentration of carbon monoxide as low as a few parts per million may poison, or permanently damage the fuel cell stack. Carbon dioxide is less hazardous to the fuel cell stack, but it is desirable to limit the concentration of carbon dioxide as well, because it will lower the potential in the fuel cell stack, and may be converted to carbon monoxide.

To protect fuel cell stack 14 from being damaged should the product stream contain concentrations of harmful components that are above acceptable threshold levels, system 10 further includes a control system 50 that monitors the composition of the product stream leaving the fuel processor. Control system 50 includes a sensor assembly 52, which includes one or more sensors adapted to detect the concentration of a specific component of the product stream. For example, sensor assembly 52 may include a sensor adapted to detect the concentration of carbon monoxide in the product stream, a sensor to detect the concentration of carbon dioxide, etc. It should be understood that assembly 52 may include one or more sensors adapted to detect the concentration of any selected component or potential impurity in the product stream. Sensor assembly 52 may additionally, or alternatively, measure the composition of the entire product stream.

Sensor assembly 52 communicates via any suitable communication pathway with a controller 54. For example, the sensor may send an electric (i.e. voltage or current) signal to the controller. Other, non-exclusive pathways, include an optical signal, wave form or any other signal that may be received by the controller and readily transduced into a control signal. Controller 54 compares the measured concentrations to acceptable threshold values, such as may be stored in a memory portion 56 of the control system. Preferably, the memory portion includes a nonvolatile component in which the threshold values are stored.

It is within the scope of the present invention that the sensor assembly may not only detect the composition of the product stream, but also compare the measured concentration(s) to corresponding stored value(s). In such an embodiment, the sensor assembly signals the controller when one or more of the threshold concentrations are exceeded.

When any of the threshold concentrations are exceeded, controller 54 automatically isolates the fuel cell stack to prevent the contaminated product stream from reaching the stack. This isolation of the fuel cell stack may be implemented in any suitable way. For example, in FIGS. 1 and 2, an isolation valve 58 is shown and, when actuated by control system 50, prevents the product stream from reaching the fuel cell stack. As shown, valve 58 diverts the product stream to a waste stream 60. System 10 may be described as including an isolation assembly that includes any suitable mechanism for preventing, upon actuation, flow of the product hydrogen stream to the fuel cell stack. For example, the assembly may include one or more isolation valves.

Sensor assembly 52 should measure the concentration of the product stream sufficiently upstream from isolation valve 58 so that there is sufficient time to measure the composition of the stream, determine whether the stream is contaminated above acceptable levels and then isolate the fuel cell stack before the stream is introduced to the stack. Therefore, it is preferable for sensor assembly 52 to analyze the product stream as far upstream from the isolation valve as possible.

With the embodiment of the fuel processing system shown in FIG. 1, control system 50 may measure the concentration of carbon monoxide or carbon dioxide in product stream 34. The concentration of carbon monoxide should be less than 10 ppm (parts per million) to prevent the control system from isolating the fuel cell stack. Preferably, the system limits the concentration of carbon monoxide to less than 5 ppm, and even more preferably, to less than 1 ppm. The concentration of carbon dioxide may be greater than that of carbon monoxide. For example, concentrations of less than 25% carbon dioxide may be acceptable. Preferably, the concentration is less than 10%, even more preferably, less than 1%. Especially preferred concentrations are less than 50 ppm. It should be understood that the acceptable minimum concentrations presented herein are illustrative examples, and that concentrations other than those presented herein may be used and are within the scope of the present invention. For example, particular users or manufacturers may require minimum or maximum concentration levels or ranges that are different than those identified herein.

When the fuel processor includes a polishing region, such as the fuel processor shown in FIG. 2, other concentrations may be measured instead of, or in addition to, those described above. For example, because carbon dioxide and carbon monoxide are converted into methane and water in the methanation portion of the polishing region, the concentration of methane or water may be monitored. Acceptable concentrations of methane in product stream 42 are less than 1%. Preferably, the concentration of methane is less than 1000 ppm, and even more preferably, less than 300 ppm. Acceptable concentrations of water in product stream 42 are less than 5000 ppm. Preferably, the concentration of water is less than 1000 ppm, even more preferably less than 300 ppm.

It should be understood that not all of the compositions being measured are necessarily harmful to the fuel cell stack. For example, neither methane nor water will damage the fuel cell stack. The concentrations of these compositions may be measured, however, because they are indicative of a failure in the separation region of the fuel processor. Because the polishing region acts as an initial safeguard to remove, within its capacity, carbon dioxide and carbon monoxide from the product stream, detecting the products from the polishing region provides advance detection of a failure in the separation region. For example, concentrations of methane or water may be detected that exceed the acceptable threshold levels well in advance of the concentrations of carbon dioxide or carbon monoxide exceeding the determined maximum levels. Because of this, detecting methane or water provides earlier detection of a failure than detecting carbon monoxide or carbon dioxide.

Water provides even earlier detection than methane because it is produced in stoichiometrically greater quantities than methane. Also, detecting water may be preferred because water/humidity sensors are currently less expensive and less prone to interference from other components of the product stream. Of course, as discussed above, it is preferable that the system detect more than one composition to ensure detection before the fuel cell stack is poisoned. It may similarly be desirable for sensor assembly 52 to include redundant sensors for any selected composition in case one of the sensors is damaged or inoperative.

Monitoring carbon dioxide should also enable earlier detection than monitoring carbon monoxide because the relative concentration of carbon dioxide in the product stream will increase before that of carbon monoxide. This is because carbon monoxide is more reactive than carbon dioxide, and therefore will be converted into methane and water in the purification region more readily than carbon dioxide.

It is within the scope of the present invention that control system 50, including sensor assembly 52, may be adapted to detect and isolate the fuel cell stack responsive to concentrations of compositions (elements, compounds, ions, etc.) not discussed herein. So long as a suitable sensor is available to detect the desired composition, controller 54 may store an associated threshold concentration value for that composition and automatically isolate the fuel cell stack should the threshold value be exceeded.

Figure 3:
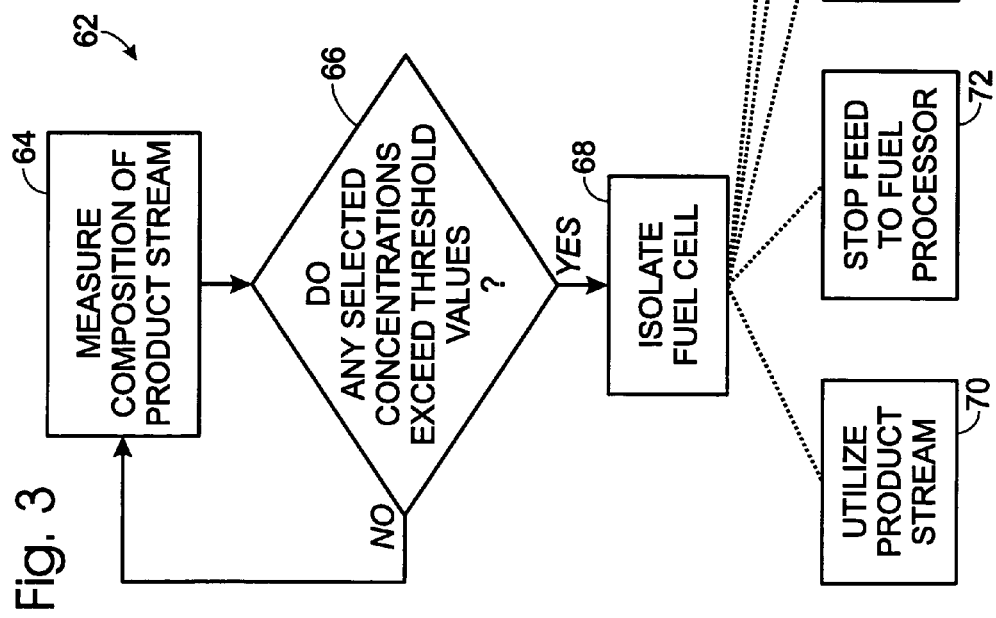
FIG. 3 is a flow diagram illustrating a method for early detection of contaminants according to the present invention.

The above-described method for preventing damage of fuel cell stack 14 by early detection of a failure in fuel processor 12 is schematically illustrated at 62 in FIG. 3. At 64, the composition of the product stream is measured. As discussed, this may include measuring the composition of the entire stream, or detecting the concentration of selected compositions in the stream. At 66, the measured concentration or concentrations are compared to stored threshold values. These threshold values correspond to acceptable threshold concentrations of the measured compositions, and if exceeded, the fuel cell stack is isolated at 68. If none of the threshold values are exceeded, then the monitoring of the product stream is repeated, thereby providing periodic, and preferably continuous, monitoring of the product stream.

In addition to isolating the fuel cell stack, control system 50 may otherwise control the operation of the fuel processing system responsive to the detected failure in the fuel processor. For example, the product stream, now in the form of waste stream 60, should be utilized or otherwise disposed of. For example, the stream may be vented to the atmosphere. However, it may be desirable to utilize stream 60 for other purposes. Because it is no longer suitable for use as a feed for a fuel cell stack 14 does not mean that it is devoid of value. For example, stream 60 may be used as a fuel for a combustion unit to provide heating to fuel processing system 10 or another device. This combustion may occur at the time the fuel cell stack is isolated, or the stream may be stored for future use. It may also be stored for future use other than for use as a fuel for a combustion unit.

Control system 50 may also automatically stop additional feedstock from being delivered to fuel processor 12. Since the actuation of the control system has occurred, thereby signaling a failure within the fuel processor, it follows that there is no need to expend any additional feedstock until the failure is fixed. Because this will typically involve shutting down the fuel processor, the control system may also automatically cause the fuel processor to begin its shut down sequence. Because the fuel cell stack has been isolated, and therefore is no longer receiving a stream of hydrogen from the fuel processor, the load being applied to the fuel cell stack should also be controlled so that the stack's ability to meet the load is not exceeded. Control system 50 may automatically trigger this control of the applied load. In addition to the above safety steps, control system 50 may also actuate a response system, which may include an alarm or other suitable device to alert users that there has been, or imminently may be, a failure within the fuel processor and that the fuel cell stack is no longer receiving a hydrogen stream from the fuel processor.

The above-described steps of the invented method, which may be implemented by the control system, are shown in FIG. 3 at 70–78. None of these steps are essential, however, it may be preferable to implement any or all of these steps in a system or method according to the present invention.

Figure 4:
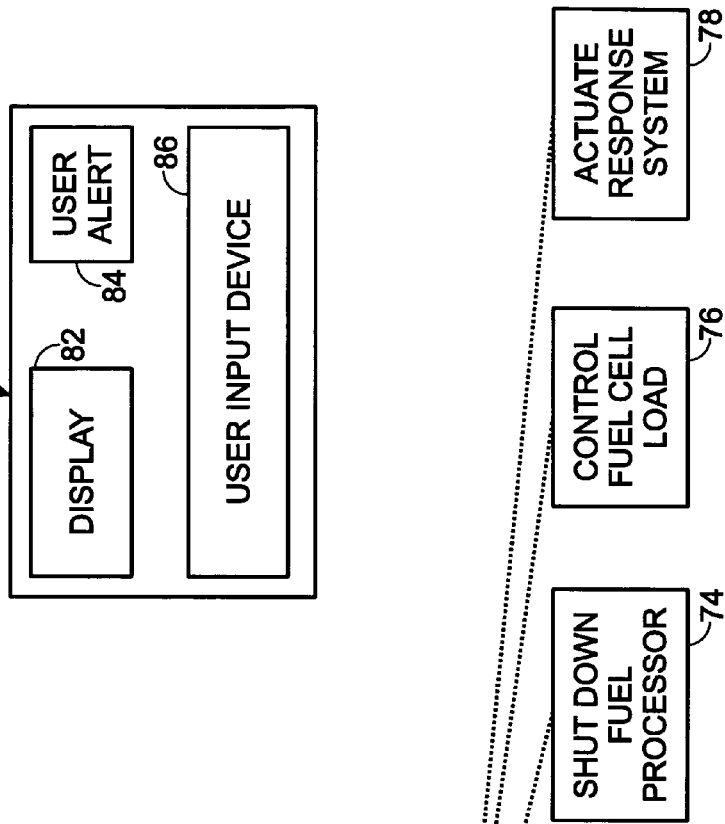
FIG. 4 is a schematic front elevation view of a user interface for a fuel processing system according to the present invention.

Control system 50 may be implemented with either a digital or an analog circuit, or a combination of the two. For example, the controller may include software executing on a processor, or it may be an analog circuit. Regardless of how controller 54 is implemented, it may, but does not necessarily, include a user interface. An example of a user interface is schematically shown in FIG. 4 and indicated generally at 80. Interface 80 enables a user to monitor and/or interact with the operation of the controller.

As shown, interface 80 includes a display region 82 in which information is presented to the user. For example, display region 82 may display the current values measured by sensor assembly 52. As discussed, this may include the entire composition of the product stream, or concentrations of selected components thereof. Other information regarding the operation and performance of the fuel processing system may also be displayed in region 82. Also shown in FIG. 4 is a user-signaling device 84 that alerts a user when an acceptable threshold level has been exceeded and the fuel cell stack has been isolated. Device 84 may include an alarm, lights, or any other suitable mechanism or mechanisms for alerting users.

User interface 80 may also include a user input device 86 through which a user communicates with the control system. For example, input device 86 may enable a user to adjust the threshold concentration values and/or to select the particular composition or compositions to be detected. Input device 86 may include any suitable device for receiving user inputs, including rotary dials and switches, push-buttons, keypads, keyboards, a mouse, touch screens, etc.

It should be understood that it is within the scope of the present invention that the fuel processing system may include a control system without a user interface, and that it is not required for the user interface to include all of the elements described herein. The elements described above have been schematically illustrated in FIG. 4 collectively, however, it is within the scope of the present invention that they may be implemented separately. For example, the user interface may include multiple display regions, each adapted to display one or more of the types of user information described above. Similarly, a single user input device may be used, and the input device may include a display that prompts the user to enter requested values or enables the user to toggle between input screens.

While the invention has been disclosed in its preferred form, the specific embodiments thereof as disclosed and illustrated herein are not to be considered in a limiting sense as numerous variations are possible. It is intended that any singular terms used herein do not preclude the use of more than one of that element, and that embodiments utilizing more than one of any particular element are within the spirit and scope of the present invention. Applicants regard the subject matter of the invention to include all novel and non-obvious combinations and subcombinations of the various elements, features, functions and/or properties disclosed herein. No single feature, function, element or property of the disclosed embodiments is essential to all embodiments. The following claims define certain combinations and subcombinations that are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of applicants' invention.

We claim:

1. A method for preventing contamination of a fuel cell stack in a fuel processing system that includes a fuel processor adapted to produce a product hydrogen stream and a fuel cell stack adapted to receive the product hydrogen stream, the method comprising:

measuring the concentration of at least one component of the product hydrogen stream;

comparing the measured concentration to a corresponding threshold value, wherein the at least one component includes a selected component that, if present in the product hydrogen stream in a concentration that is at least as great as the corresponding threshold value, is not harmful to the fuel cell stack, and further wherein the selected component includes water; and preventing delivery of the product hydrogen stream to the fuel cell stack if the measured concentration exceeds the corresponding threshold value.

2. The method of claim 1, wherein the method further includes automatically preventing delivery of the product hydrogen stream to the fuel cell stack if the measured concentration exceeds the corresponding threshold value.

3. The method of claim 1, wherein the preventing step includes actuating an isolation valve configured to interrupt the flow of the product hydrogen stream to the fuel cell stack if the measured concentration exceeds the corresponding threshold value.

4. The method of claim 3, wherein the preventing step includes automatically actuating the isolation valve if the measured concentration exceeds the corresponding threshold value.

5. The method of claim 1, wherein the preventing step includes venting the product hydrogen stream if the measured concentration exceeds the corresponding threshold value.

6. The method of claim 5, wherein the preventing step includes automatically venting the product hydrogen stream if the measured concentration exceeds the corresponding threshold value.

7. The method of claim 1, wherein the preventing step includes storing the product hydrogen stream if the measured concentration exceeds the corresponding threshold value.

8. The method of claim 7, wherein the preventing step includes automatically storing the product hydrogen stream if the measured concentration exceeds the corresponding threshold value.

9. The method of claim 1, wherein the method further includes shutting down the fuel processor if the measured concentration exceeds the corresponding threshold value.

10. The method of claim 9, wherein the method further includes automatically shutting down the fuel processor if the measured concentration exceeds the corresponding threshold value.

11. The method of claim 1, wherein the method further includes actuating a response system if the measured concentration exceeds the corresponding threshold value.

12. The method of claim 11, wherein the method further includes automatically actuating the response system if the measured concentration exceeds the corresponding threshold value.

13. The method of claim 11, wherein the response system includes a user-notification device.

14. The method of claim 1, wherein the method further includes limiting a load that may be applied to the fuel cell stack if the measured concentration exceeds the corresponding threshold value.

15. The method of claim 14, wherein the method further includes automatically limiting the load that may be applied to the fuel cell stack if the measured concentration exceeds the corresponding threshold value.

16. A method for preventing contamination of a fuel cell stack in a fuel processing system that includes a fuel processor adapted to produce a product hydrogen stream and a fuel cell stack adapted to receive the product hydrogen stream, the method comprising:
measuring the concentration of at least one component of the product hydrogen stream;
comparing the measured concentration to a corresponding threshold value, wherein the at least one component includes a selected component that, if present in the product hydrogen stream in a concentration that is at least as great as the corresponding threshold value, is not harmful to the fuel cell stack, and further wherein the selected component includes methane; and
preventing delivery of the product hydrogen stream to the fuel cell stack if the measured concentration exceeds the corresponding threshold value.

17. The method of claim 16, wherein the corresponding threshold value corresponds to methane comprising 1% of the product hydrogen stream.

18. The method of claim 16, wherein the corresponding threshold value corresponds to 1000 ppm of methane in the product hydrogen stream.

19. The method of claim 16, wherein the corresponding threshold value corresponds to 300 ppm of methane in the product hydrogen stream.

20. The method of claim 1, wherein the selected component includes carbon dioxide.

21. The method of claim 20, wherein the corresponding threshold value corresponds to carbon dioxide comprising 25% of the product hydrogen stream.

22. The method of claim 20, wherein the corresponding threshold value corresponds to carbon dioxide comprising 10% of the product hydrogen stream.

23. The method of claim 20, wherein the corresponding threshold value corresponds to carbon dioxide comprising 1% of the product hydrogen stream.

24. The method of claim 20, wherein the corresponding threshold value corresponds to 50 ppm of carbon dioxide in the product hydrogen stream.

25. The method of claim 1, wherein the corresponding threshold value corresponds to 5000 ppm of water in the product hydrogen stream.

26. The method of claim 1, wherein the corresponding threshold value corresponds to 1000 ppm of water in the product hydrogen stream.

27. The method of claim 1, wherein the corresponding threshold value corresponds to 300 ppm of water in the product hydrogen stream.

28. The method of claim 16, wherein the selected component further includes water.

29. The method of claim 16, wherein the selected component further includes carbon dioxide.

30. The method of claim 16, wherein the method further includes automatically preventing delivery of the product hydrogen stream to the fuel cell stack if the measured concentration exceeds the corresponding threshold value.

31. The method of claim 16, wherein the preventing step includes actuating an isolation valve configured to interrupt the flow of the product hydrogen stream to the fuel cell stack if the measured concentration exceeds the corresponding threshold value.

32. The method of claim 31, wherein the preventing step includes automatically actuating the isolation valve if the measured concentration exceeds the corresponding threshold value.

33. The method of claim 16, wherein the preventing step includes venting the product hydrogen stream if the measured concentration exceeds the corresponding threshold value.

34. The method of claim 33, wherein the preventing step includes automatically venting the product hydrogen stream if the measured concentration exceeds the corresponding threshold value.

35. The method of claim 16, wherein the preventing step includes storing the product hydrogen stream if the measured concentration exceeds the corresponding threshold value.

36. The method of claim 35, wherein the preventing step includes automatically storing the product hydrogen stream if the measured concentration exceeds the corresponding threshold value.

37. The method of claim 16, wherein the method further includes shutting down the fuel processor if the measured concentration exceeds the corresponding threshold value.

38. The method of claim 37, wherein the method further includes automatically shutting down the fuel processor if the measured concentration exceeds the corresponding threshold value.

39. The method of claim 16, wherein the method further includes actuating a response system if the measured concentration exceeds the corresponding threshold value.

40. The method of claim 39, wherein the method further includes automatically actuating the response system if the measured concentration exceeds the corresponding threshold value.

41. The method of claim 39, wherein the response system includes a user-notification device.

42. The method of claim 16, wherein the method further includes limiting a load that may be applied to the fuel cell stack if the measured concentration exceeds the corresponding threshold value.

43. The method of claim 42, wherein the method further includes automatically limiting the load that may be applied to the fuel cell stack if the measured concentration exceeds the corresponding threshold value.

* * * * *